United States Patent [19]

Hirota et al.

[11] Patent Number: 4,600,154
[45] Date of Patent: Jul. 15, 1986

[54] STATIC EXPANSIVE DEMOLITION AGENT IN THE THREE-DIMENSIONAL FORM AND PROCESS FOR DEMOLISHING BRITTLE MATERIAL USING THE SAME

[75] Inventors: Takao Hirota, Ibaraki; Yoichi Ishizaki, Nobeoka, both of Japan

[73] Assignee: Asahi Kasei Kogyo Kabushiki Kaisha, Tokyo, Japan

[21] Appl. No.: 627,643

[22] Filed: Jul. 3, 1984

[30] Foreign Application Priority Data

Jul. 4, 1983 [JP] Japan .................................. 58-120402

[51] Int. Cl.⁴ ........................ B02C 19/00; C09K 3/00; C09K 3/18
[52] U.S. Cl. ...................................................... 241/1
[58] Field of Search ................ 252/1, 70, 378 R, 350; 299/14; 241/1; 125/23 R

[56] References Cited

U.S. PATENT DOCUMENTS 4,316,583 2/1982 Kawano ................................. 241/1

FOREIGN PATENT DOCUMENTS

| | | |
|---|---|---|
| 48-25337 | of 1973 | Japan . |
| 49-21924 | of 1974 | Japan . |
| 56-67059 | 6/1981 | Japan . |
| 0136954 | 8/1982 | Japan ..................................... 241/1 |
| 58-180245 | of 1983 | Japan ..................................... 241/1 |

Primary Examiner—Richard D. Lovering
Attorney, Agent, or Firm—Finnegan, Henderson, Farabow, Garrett & Dunner

[57] ABSTRACT

A static expansive demolition agent in the three-dimensional form obtained by compression-molding a powdery composition comprising calcium oxide as the expansive component, an aluminous cement and an alkali or alkaline earth metal salt of boric acid. Said static expansive demolition agent can be placed as it is in holes in a brittle material to be demolished and when water is subsequently poured into the hole the maximum pressure of expansion can be reached in a very short period of time to demolish the brittle material.

6 Claims, 3 Drawing Figures

F I G. 1
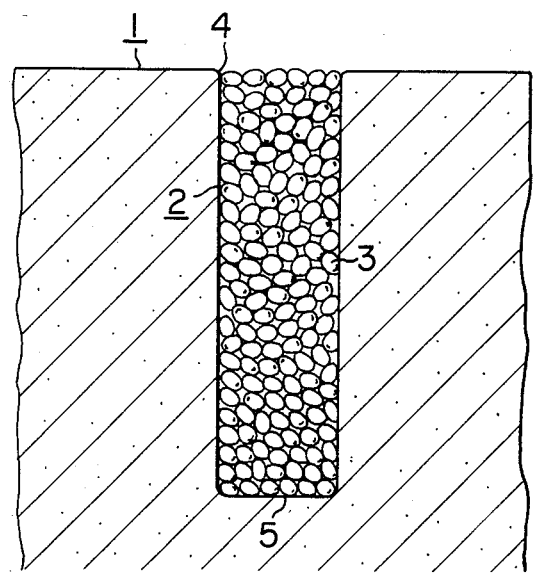
F I G. 2
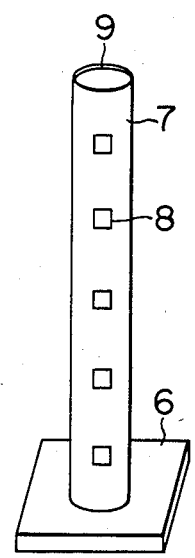

STATIC EXPANSIVE DEMOLITION AGENT IN THE THREE-DIMENSIONAL FORM AND PROCESS FOR DEMOLISHING BRITTLE MATERIAL USING THE SAME

This invention relates to a static expansive demolition agent in the three-dimensional form and a method for the static demolition of a brittle material such as concrete, rock or the like. More particularly, it relates to a static expansive demolition agent in the three-dimensional form and a method for the static demolition of a brittle material which can exhibit its demolition effect in a short time.

Explosives have heretofore been used as demolition agents for brittle materials such as concrete, rock and the like. A demolition method using explosives has a great demolition force and can demolish a large amount of the brittle materials in a short time, and therefore, has widely been used. On the other hand, when explosives are used in the demolition of brittle materials environmental pollutions are caused owing to noise, vibration, flying stones and dusts accompanying explosion of explosives, and dangers accompany the demolition workings. Therefore, the explosive or the demolition method using them cannot be employed where there are buildings and the like in the neighborhood of the materials to be demolished.

A demolition method using a static expansive demolition agent is now being developed as a new demolition method which has overcome the disadvantages of the demolition method using explosives. Said static expansive demolition method is a method which comprises drilling holes in a brittle material such as concrete or the like and filling the holes with the demolition agent in the form of an aqueous slurry. The static expansive demolition agent placed in the holes reacts with water to cause cubical expansion, and the expanding force at that time demolishes the brittle material to be demolished. Therefore, at the time of demolition, noise, vibration and flying stones as in the case of explosives are not caused, and there are little dangers. This is advantageous. The above demolition method having such characteristics is highlighted as a demolition method free from environmental pollution, and eight or nine static expansive demolition agents have already been commercially available.

However, the commercially available static expansive demolition agents which are under practice require a long period of 12 to 24 hours from the filling of holes with the agents to the demolition of the brittle materials, though said time varies depending upon ambient temperature, and hence, has the disadvantage that the working efficiency is bad.

Moreover, when the static expansive demolition agent is used at such a temperature as to exceed the upper limit of temperature for application of the agent, for example, when BRISTAR 200 (manufactured by Onoda Cement Company, Limited) having an application temperature range of 5° to 15° C. is applied at a temperature of more than 15° C., or when the diameter of the holes in the brittle material to be demolished is more than 50 mm even though the application temperature falls within the above range, the heat of reaction generated by the reaction of the static expansive demolishing agent with water is accumulated in the interior of the agent, and a part of the water contained in the static expansive demolition agent is vaporized by said heat energy, whereby the vapor pressure in the holes is increased, and the filled static expansive demolition agent is explosively spouted out of the hole (this is called "spouting-out phenomenon" or "gun-phenomenon") (hereinafter referred to as the gun-phenomenon). Therefore, no demolition effect is obtained. In addition, there is a great danger in working. Even when the static expansive demolition agent is applied at a temperature within the application temperature range to a hole having a diameter of less than 50 mm, the gun-phenomenon is often caused when the change of ambient temperature is large, when the brittle material to be demolished is at a high temperature due to the effect of solar heat or when the water mixed with the agent is at a high temperature. This becomes a problem.

In order to prevent the gun-phenomenon, Japanese Patent Application Kokai (Laid-Open) No. 25,337/73 and No. 21,924/74 propose a method which comprises filling a static expansive demolition agent into holes in a brittle material to be demolished, and applying a mortar or an implement to the top of the filled agent to seal the holes. However, according to this method, the workability is bad and the cost becomes high.

The present inventors have conducted extensive research on a demolition agent and a demolition method free from the above disadvantages to find that when the demolition agent is applied in the three-dimensional form to holes in a brittle material and thereafter water is poured into the holes, the above disadvantages can be overcome.

According to this invention, there is provided a static expansive demolition agent in the three-dimensional form obtained by compression-molding a powdery composition comprising calcium oxide as an expansive component, an aluminous cement and an alkali or alkaline earth metal salt of boric acid.

This invention further provides a process for the static expansive demolition of brittle materials which comprises drilling holes in a brittle material, filling the holes with the above-mentioned static expansive demolition agent in the three-dimensional form and thereafter pouring water into the holes.

BRIEF DESCRIPTION OF THE DRAWING

This invention is illustrated below referring to the accompanying drawings, in which FIG. 1 shows a cross section of a hole filled with the present static expansive demolition agent, FIG. 2 shows a sketch of a device for measuring the pressure of expansion.

In FIG. 1, reference number 1 refers to a brittle material to be demolished, 2 to a hole, 3 to three-dimensional particles of a static expansive demolition agent, 4 to the opening of the hole 2, and 5 to the bottom of the hole 2. In FIG. 2, reference number 6 refers to a steel plate, 7 to a carbon steel pipe, 8 to strain gauges attached to the pipe 7, and 9 to the opening of the pipe 7.

In FIG. 1, a hole 2 having a certain length and a certain width is drilled at a certain distance in a brittle material 1 to be demolished such as concrete or the like, and the hole 2 is filled with three-dimensional particles of static expansive demolition agent 3, after which water is poured into the hole 2 through the openings 4 of the hole 2, thereby expanding the static expansive demolition agent 3 by hydration to demolish the brittle material.

Figure 3:
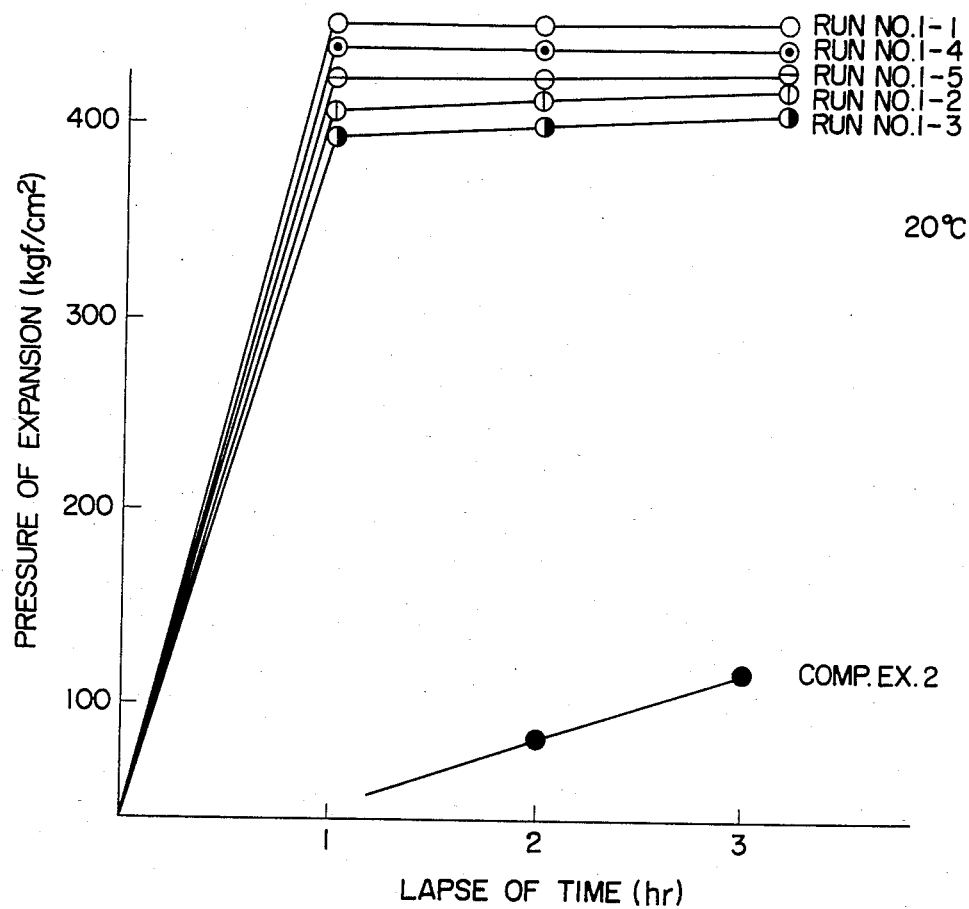
FIG. 3 shows expansion pressure-generating curves.

The static expansive demolition agent 3 is characterized in that it is in the three-dimensional form obtained by compression-molding a powdery composition comprising calcium oxide, an aluminous cement and an alkali or alkaline earth metal salt of boric acid. When a powdery static expansive demolition agent is used this must be previously mixed with water in a vessel to form a slurry, and this slurry must be poured into the hole 2. However, in this case, the flowability of the slurry is reduced during the mixing or pouring working and hence the pouring of the slurry into the hole often becomes difficult. In particular, this tendency appears remarkably when the demolition agent is sensitive to hydration reaction. Since the present static expansive demolition agent has a three-dimensional form, it is possible to first fill the hole 2 with the static expansive demolition agent and subsequently pour water into the hole 2, and therefore, the present static expansive demolition agent can overcome the disadvantage of the conventional powdery demolishing agent that the flowability of the slurry is reduced. Moreover, the present static expansive demolition agent placed in the hole is reacted with the water poured thereinto to generate the heat of reaction, whereby water vapor is formed, but this water vapor can be released into the atmosphere through spaces existing between the particles of the present static expansive demolition agent unlike the case where the slurry of a conventional powdery demolition agent is poured. Therefore, the gun-phenomenon is difficult to cause.

Powdery static expansive demolition agents which are now commercially available are designed so that the maximum pressure of expansion is reached about 12 to 24 hours after the pouring of the slurry into the hole. If such a component as to shorten the above-mentioned time of reaching the maximum pressure of expansion is used the temperature elevation of the slurry becomes sudden and it becomes impossible to release the water vapor formed by the sudden elevation of temperature because the viscosity of the slurry is high. Therefore, the gun-phenomenon tends to be caused. In order to inhibit the gun-phenomenon it is necessary to inhibit the sudden elevation of temperature of the slurry placed in the hole. For this purpose, measures must be taken for making the rate of the hydration reaction of calcium oxide which is the expansive component low. As a result, the time of reaching the maximum pressure of expansion cannot be made so short, and at present, a period of about 12 to 24 hours is set as said time. As compared with such a prior art technique, the present static expansive demolition agent and the static expansive demolition method using the present static expansive demolition agent enable the water vapor formed to be released into the atmosphere, and therefore, even when the temperature of the system is suddenly elevated by the heat of hydration reaction the gun-phenomenon can be inhibited. Such technical features enable the realization of a static expansive demolition agent comprising such a component as to shorten the time of reaching the maximum pressure of expansion. When the present static expansive demolition agent is used no gun-phenomenon is caused and it becomes possible to reach such a great pressure of expansion as 300 kgf/cm$^2$ or more within one hour.

The constituents of the present static expansive demolition agent in the three-dimensional form are as follows:

Calcium oxide is used as the expansive component, and there may be used quick lime and calcined dolomite as the calcium oxide, of which quick lime is preferred because it contains a large amount of calcium oxide and makes it possible to obtain a large pressure of expansion. The rate of hydration of quick lime may be varied depending upon the degree of burning, but the so-called soft-burnt quick lime is too fast in hydration reaction, while dead-burnt quick lime is too slow in hydration reaction. Therefore, these are not easy to use. The hard-burnt quick lime which is obtained by burning quick lime at around 1,300° C. is particularly preferred in view of the rate of hydration and ease of control of hydration by adding an additive. It is preferred that the quick lime has a Blaine value of 2,000–10,000 cm$^2$/g. When the Blaine value is less than 2,000 a time required to reach the maximum pressure of expansion tends to increase, and when it is more than 10,000 it tends to be difficult to prepare the desired powder and the amount of the additive for controlling hydration tends to become larger.

The aluminous cement used in this invention includes cements comprising, as the principal component, a calcium aluminate such as $CaO.Al_2O_3$, $12CaO.7Al_2O_3$, $CaO.2Al_2O_3$, $3CaO.Al_2O_3$, $CaO.6Al_2O_3$ or the like, and the typical examples thereof are commercially available aluminous cements, for example, Denka Alumina Cement manufactured by Denki Kagaku Kogyo Kabushiki Kaisha, and Asahi Fondu manufactured by Asahi Glass Company, Limited, which can be used as they are. Alternatively, there may be used a product obtained by burning a calcarious material and an aluminous material and pulverizing the calcium aluminate thus obtained into particles having a Blaine value of about 3,000 cm$^2$/g.

Another essential constituent of the present static expansive demolition agent is an alkali or alkaline earth metal salt of boric acid. As the alkali metal, lithium, sodium and potassium are preferably used, and as the alkaline earth metal, magnesium and calcium are preferably used. When a static expansive demolition agent is prepared from only calcium oxide and aluminous cement without using any alkali or alkaline earth metal salt of boric acid, it tends to be powdered upon reacting with water, and therefore, it is difficult to obtain a great pressure of expansion in the direction to the side wall of the hole which is required to demolish a brittle material to be demolished. In addition, the gun-phenomenon tends to be caused. The alkali or alkaline earth metal salt of boric acid may be a synthetic one or a naturally occurring one containing said constituent.

The blending proportions of the calcium oxide, aluminous cement and alkali or alkaline earth metal salt of boric acid may be varied depending upon the burning degree and particle size of quick lime, the kind of the aluminous cement, the kind and particle size of the alkali or alkaline earth metal salt of boric acid and the external conditions under which the static expansive demolition agent is used such as temperature and the like; however it is preferred that the powdery composition comprises 40 to 90% by weight of calcium oxide and 10 to 60% by weight of an aluminous cement based on the total weight of the calcium oxide and the aluminous cement and 1 to 20 parts by weight of an alkali or alkaline earth metal salt of boric acid per 100 parts by weight of the total of the calcium oxide and the aluminous cement. When the proportion of calcium oxide is less than 40% by weight the resulting maximum pressure of expansion becomes lower than a certain level and the demolition of a brittle material requires a large number of holes to be filled with the static expansive demolition agent of this invention. Therefore, it is economically disadvantageous. As the proportion of calcium oxide increases the maximum pressure of expansion increases. However, when it exceeds 90% by weight, the proportion of the aluminous cement to the calcium oxide becomes lower than a certain level and the static expansive demolition agent tends to be powdered and it becomes difficult to obtain an effective pressure of expansion for demolishing a brittle material to be demolished.

The blending proportion of the alkali or alkaline earth metal salt of boric acid must, of course, be determined depending upon the kind of the salt, the kind and proportions of the calcium oxide and aluminous cement to be combined with the alkali or alkaline earth metal salt of boric acid. However, when the blending proportion is too small, the static expansive demolition agent tends to be powdered with the progress of hydration of calcium oxide like the case of a static expansive demolition agent consisting of calcium oxide and an aluminous cement, and hence, it becomes difficult to obtain a sufficiently large pressure of expansion in the direction to the side wall of the hole in a brittle material to be demolished. On the other hand, when the blending proportion is too large, the time of reaching the maximum pressure of expansion becomes too long and this is not desirable. For the purpose of obtaining a pressure of expansion of at least 300 kgf/cm$^2$ in a short time, for example, within one hour, it is preferred that the proportion of the alkali or alkaline earth metal salt of boric acid is 1 to 20 parts by weight, per 100 parts by weight of the total of the calcium oxide and the aluminous cement.

The method of preparing the present static expansive demolition agent in the three-dimensional form is explained below.

The static expansive demolition agent is prepared by mixing a previously powdered calcium oxide, an aluminous cement and a powdery alkali or alkaline earth metal salt of boric acid, and subsequently compression-molding the resulting mixture by means of a tabletting machine, a briquetting machine, a pelletizer or the like. In this case, a molding adjuvant such as kerosene, an alcohol or the like may be added to increase the moldability or processability. The three-dimensional form of the static expansive demolition agent 3 is such that the water poured into the hole 2 in a brittle material to be demolished through the opening 4 tends to be dispersed and reach the bottom 5 and the water vapor generated by the heat of hydration reaction between the static expansive demolition agent and the water poured into the hole tends to be released into the atmosphere through the spaces between particles of the demolition agent, and includes, for example, column, oblong, disk, polyhedron, and these forms in which the angles have been rounded off. Moreover, there may be used particles formed by compression-molding a powder and then pulverizing the resulting compression-molded article into the desired size. Specifically, tablets, briquettes and pellets may preferably be used. The static expansive demolition agent 3 of this invention has preferably a volume of 0.05 to 10 cm$^3$ when the caliber of the hole 2 is 30 to 100 mm as in the usual case in view of ease of filling the hole with the agent and the pressure of expansion due to the hydration of the agent after the filling. When the volume is less than 0.05 cm$^3$ it is difficult for water to reach the bottom of the hole 2 and the demolition effect, therefore, becomes small. Moreover, the compression-molding cost increases, and hence, said condition is disadvantageous in economy. On the other hand, when the volume is more than 10 cm$^3$ the amount of the static expansive demolition agent which can be placed in the hole 2 becomes smaller and the space becomes larger, resulting in a smaller pressure of expansion in the direction to side wall of the hole and hence the demolition effect becomes small.

The bulk density of each particle of the static expansive demolition agent 3 must be such that it has such a hardness that the particle is difficult to break under working and that the particle can keep its original form until the water vapor generated by the initial stage of hydration reaction in the hole 2 has passed through the spaces between the particles and has been released into the atmosphere, and it is preferably in the range of 2.0 to 3.2. When the bulk density is less than 2.0, the particles of the static expansive demolition agent tend to be broken under working. On the other hand, at a bulk density of more than 3.2, it becomes difficult to prepare the desired three-dimensional form of the static expansive demolition agent and the permeation of water into the static expansive demolition agent becomes difficult.

In this invention, one form of the static expansive demolition agent may be used and two or more different forms of the static expansive demolition agent may also be used in admixture.

As is clear from the above discussions, the use of the present static expansive demolition agent in the three-dimensional form makes it unnecessary to previously mix the demolition agent with water to form an aqueous slurry and then rapidly fill the holes with the resulting slurry as in the conventional method using a known demolition agent. In the present invention, it is sufficient to first fill the holes in a brittle material with the present static expansive demolition agent in the three-dimensional form and then pour water into the holes. In addition, the present static expansive demolition agent can generate a pressure of expansion of about 300 kgf/cm$^2$ within a very short time of one hour. Therefore, the present process has a high working efficiency and a great economical effect.

Moreover, it is possible to prevent a danger due to gun-phenomenon according to the present process, and the safty in working can be enhanced. Furthermore, the present static expansive demolition agent can be applied to holes having a caliber of 50 mm or more in the demolition working, and therefore, it is possible to increase the amount of the demolition agent per one hole, and consequently, a larger demolition force can be obtained, which enables the distance between the holes to be widened and the necessary number of holes to be reduced. Thus, the demolition work is made effective and economic.

This invention is further explained below in more detail referring to Examples, which are merely by way of illustration and not by way of limitation.

EXAMPLE 1

A commercially available aluminous cement (manufactured by Denki Kagaku Kogyo Kabushiki Kaisha) comprising $CaO.Al_2O_3$ as the main component and having a Blaine value of 5,000 cm$^2$/g and the chemical analysis values shown in Table 2 (20 parts by weight) was throughly mixed with 80 parts by weight of hard-burnt quick lime having the chemical analysis values shown in Table 2 obtained by burning quick lime at about 1,300° C. which had been pulverized into a Blaine value of 5,000 cm$^2$/g and one of the metal salts indicated in Table 1 in the amount mentioned in Table 1 to prepare a powder composition, which was then molded into an almond-like shape having a volume of 3 cm$^3$ and a bulk density of 2.7 by means of a briquetting machine. The static expansive demolition agent thus obtained was charged into the steel pipe 7 as shown in FIG. 2, and thereafter, water was poured into the steel pipe 7, after which the agent was allowed to be hydrated with the water at an ambient temperature of 20° C. and the pressure of expansion was measured every hour by means of the strain-gauges 8 attached to the pipe. The results obtained are shown in FIG. 3.

TABLE 1

| Run No. | Metal salt Name | Formula | Amount added (part by wt.) |
|---|---|---|---|
| 1 | Lithium borate | $Li_2B_4O_7$ | 5 |
| 2 | Sodium borate | $Na_2B_4O_7$ | 2 |
| 3 | Potassium borate | $K_2B_4O_7$ | 2 |
| 4 | Magnesium borate | $Mg(BO_2)_2$ | 2 |
| 5 | Calcium borate | $CaB_4O_7$ | 3 |

TABLE 2

| | (% by weight) | | | | | | |
|---|---|---|---|---|---|---|---|
| | Ig. loss | $SiO_2$ | $Al_2O_3$ | $Fe_2O_3$ | CaO | MgO | $SO_3$ | Total |
| Hard-burnt quick lime | 1.5 | 0.8 | 1.4 | 0.5 | 93.2 | 0.8 | 1.1 | 99.3 |
| Aluminous cement | 0.9 | 6.5 | 48.2 | 10.7 | 31.6 | 1.9 | 0.0 | 99.8 |

The pressure of expansion was measured by the following method:

A device as shown in FIG. 2 was used wherein a carbon steel pipe 7 having a length of 1,000 mm, an outer diameter of 62 mm and a wall thickness of 6 mm was sealed at the bottom by welding it to a steel plate 6 and strain-gauges 8 were attached to the pipe 7 as shown in FIG. 2. The steel pipe 7 was filled with the static expansive demolition agent by charging the agent through the opening 9, and thereafter, water was poured into the pipe 7. The strains caused in the steel pipe were measured with the lapse of time, and the inner pressure (pressure of expansion) was calculated.

From FIG. 3, it can be seen that when the present static expansive demolition agent was used, a pressure of expansion of about 400 kgf/cm$^2$ was reached within one hour.

COMPARATIVE EXAMPLE 1

The same procedure as in Example 1 was repeated, except that the metal salt was not used and the resulting composition was molded to obtain pellets. The pellets thus obtained were subjected to the same test as in Example 1. Three minutes after the pouring of water, gun-phenomenon was caused.

COMPARATIVE EXAMPLE 2

The same procedure as in Example 1 was repeated, except that a commercially available static expansive demolition agent for spring or autumn (the main components: CaO, 3CaO.SiO$_2$ and CaSO$_4$) was used and an aqueous slurry was formed at a ratio of water/solids of 0.3 and charged into the steel pipe 7 in FIG. 2, to measure the pressure of expansion. The results obtained are shown in FIG. 3 as Comparative Example 2. At an ambient temperature of 20° C., a period of about 20 hours was required to obtain a pressure of expansion of 300 kgf/cm$^2$.

EXAMPLE 2 AND COMPARATIVE EXAMPLES 3 AND 4

A 1-m$^3$ piece of plain concrete having drilled therein a hole having a caliber of 65 mm and a length of 800 mm was used as a test specimen. The hole was filled with a static expansive demolition agent having the composition, the shape and the volume shown in Table 3, and thereafter, water was poured thereinto to observe the state of demolition of the concrete. In this case, the same hard-burnt quick lime as in Example 1 was used as the oalcium oxide, and the same aluminous cement as in Example 1 was used.

For comparison, the powdery composition of the present static expansive demolition agent which had not been subjected to compression-molding was first charged into the hole and then water was poured into the hole (Comparative Example 3), or alternatively, the same commercially available static expansive demolition agent in the form of powder as in Comparative Example 2 was previously mixed with water in a vessel and the resulting aqueous slurry was then poured into the hole (Comparative Example 4), and the same expansion test as above was conducted.

The results obtained are shown in Table 3. According to the present process, there is no problem of pot life that the flowability of the slurry is decreased during the mixing, and the demolition working can be safely completed in a very short period of 1 to 2 hours without causing gun-phenomenon.

Further, from Run Nos. 2-1 to 2-7 in which the same composition and the same shape were used, it can be seen that static expansive demolition agents having a volume of 0.05 to 10 cm$^3$ and a bulk density of 2.0 to 3.2 (Run Nos. 2-2 to 2-5) showed better demolition (larger demolition width) than those outside the ranges (Run Nos. 2-1, 2-6 and 2-7).

TABLE 3

| | Demolition agent | | | | |
|---|---|---|---|---|---|
| Run No. | Composition (part by wt.) | | Shape | Volume (cm$^3$) | Bulk density | Demolition state |
| 2-1 | Aluminous cement | 20 | Sphere | 0.01 | 2.7 | Cracked in about 1 hr. |
| | Quick lime | 80 | | | | |
| | Lithium borate | 5 | | | | |
| 2-2 | Aluminous cement | 20 | " | 0.05 | 2.7 | Good crack was caused in about 1 hr. |
| | Quick lime | 80 | | | | |
| | Lithium borate | 5 | | | | |

TABLE 3-continued

| Run No. | Composition (part by wt.) | | Shape | Volume (cm³) | Bulk density | Demolition state |
|---|---|---|---|---|---|---|
| 2-3 | Aluminous cement | 20 | " | 0.35 | 2.7 | Good crack was caused in about 1 hr. |
| | Quick lime | 80 | | | | |
| | Lithium borate | 5 | | | | |
| 2-4 | Aluminous cement | 20 | " | 5.6 | 2.7 | Good crack was caused in about 1 hr. |
| | Quick lime | 80 | | | | |
| | Lithium borate | 5 | | | | |
| 2-5 | Aluminous cement | 20 | " | 10 | 2.7 | Good crack was caused in about 1 hr. |
| | Quick lime | 80 | | | | |
| | Lithium borate | 5 | | | | |
| 2-6 | Aluminous cement | 20 | " | 11.8 | 7.6 | Cracked in about 1 hr. |
| | Quick lime | 80 | | | | |
| | Lithium borate | 5 | | | | |
| 2-7 | Aluminous cement | 20 | " | 2.7 | 1.8*4 | " |
| | Quick lime | 80 | | | | |
| | Lithium borate | 5 | | | | |
| 2-8 | Aluminous cement | 20 | Column | 7.3 | 2.7 | Good crack was caused in about 2 hrs. |
| | Quick lime | 80 | | | | |
| | Sodium borate | 2 | | | | |
| 2-9 | Aluminous cement | 20 | " | 2.5 | 2.8 | Good crack was caused in about 2 hrs. |
| | Quick lime | 80 | | | | |
| | Calcium borate | 5 | | | | |
| 2-10 | Aluminous cement | 20 | Disc | 2.5 | 2.6 | Good crack was caused in about 1 hr. |
| | Quick lime | 80 | | | | |
| | Colemanite*1 | 15 | | | | |
| Comp. Ex. 3 | Aluminous cement | 30 | Powder*2 | — | — | Water reached only the upper part and the concrete was not demolished. |
| | Quick lime | 70 | | | | |
| | Sodium borate | 5 | | | | |
| Comp. Ex. 4 | Commercially available demolition agent | | Slurry*3 | — | — | Gun-phenomenon was caused and the concrete was not demolished. |

Note:
*1Naturally occurring calcium borate having a Blaine value of 2,500 cm²/g.
*2The powder per se was charged into the hole and then water was poured thereinto.
*3The powder was previously mixed with water to form a slurry and the slurry was poured into the hole.
*4The particle was allowed to fall on a concrete floor from a height of 1 m, upon which it was broken.

EXAMPLE 3

A 1-m³ piece of plain concrete having drilled therein a hole having a caliber of 65 mm and a length of 800 mm was used as a test specimen. The hole was filled with the static expansive demolition agent shown in Table 4, and thereafter water was poured thereinto to observe the state of demolition of the concrete. In this case, the same hard-burnt quick lime as in Example 1 was used as the calcium oxide, and the same aluminous cement as in Example 1 was used.

As a result, it was confirmed that the aluminous cement and lithium borate have a great effect on preventing the gun-phenomenon and on the demolition of concrete.

TABLE 4

| Run No. | Composition (part by wt.) | | Shape | Volume (cm³) | Bulk density | Demolition state |
|---|---|---|---|---|---|---|
| 3-1 | Aluminous cement | 80 | Sphere | 3.0 | 2.8 | Not demolished |
| | Quick lime | 20 | | | | |
| | Lithium borate | 6 | | | | |
| 3-2 | Aluminous cement | 60 | " | " | " | Good demolition |
| | Quick lime | 40 | | | | |
| | Lithium borate | 6 | | | | |
| 3-3 | Aluminous cement | 40 | " | " | " | " |
| | Quick lime | 60 | | | | |
| | Lithium borate | 6 | | | | |
| 3-4 | Aluminous cement | 20 | " | " | " | " |
| | Quick lime | 80 | | | | |
| | Lithium borate | 6 | | | | |
| 3-5 | Aluminous cement | 50 | " | " | " | Not demolished |
| | Quick lime | 50 | | | | |
| | Lithium borate | — | | | | |
| 3-6 | Aluminous cement | — | " | " | " | Gun-phenomenon was caused and the concrete was not demolished. |
| | Quick lime | 100 | | | | |
| | Lithium borate | — | | | | |

EXAMPLE 4

One hole having a caliber of 60 mm and a length of 800 mm was drilled in a 1-m³ piece of plain concrete. This hole was filled with disc-shaped pellets having a volume of 1.5 cm³ and a bulk density of 2.6 prepared by compression-molding a powdery composition consisting of 20 parts by weight of the same aluminous cement as in Example 1, 80 parts by weight of the same hard-burnt quick lime as in Example 1 and 5 parts by weight of lithium borate, and thereafter, water was poured into the hole. The concrete was allowed to stand at an ambient temperature of 5° C. As a result, the concrete was completely demolished in about 30 minutes, and no gun-phenomenon was generated at all.

COMPARATIVE EXAMPLE 5

A commercially available static expansive demolition agent for winter (CaO, $3CaO.SiO_2$ and $CaSO_4$ were the main components) was mixed with water to form a slurry (water/solids ratio=0.3). The same hole as in Example 4 was filled with the slurry, and the concrete was allowed to stand at an ambient temperature of 5° C. It was observed that a period of about 26 hours was required to demolish the concrete.

EXAMPLE 5

A about 2-$m^3$ piece of limestone having drilled therein two holes having a caliber of 65 mm and a length of 1200 mm was used as a test specimen. The holes were filled with almond-shaped demolition agent particles obtained by compression-molding a powdery composition consisting of 30 parts by weight of the same aluminous cement as in Example 1, 70 parts by weight of the same hard-burnt quick lime as in Example 1 and 2 parts by weight of sodium borate, said particles having a volume of 3 $cm^3$ and a bulk density of 2.6, and thereafter, water was poured into the holes. The limestone was allowed to stand at an ambient temperature of 28° C. to observe the state. As a result, it was confirmed that the limestone was well demolished in 40 minutes without being accompanied by gun-phenomenon.

EXAMPLE 6

Three holes having a caliber of 65 mm and a length of 110 cm were drilled at a distance of 70 cm by means of a crawler drill in a piece of sandstone having a size of $2.0 \times 1.4 \times 1.3$ m, and filled with almond-shaped particles of a static expansive demolition agent prepared by compression-molding 20 parts by weight of the same aluminous cement as in Example 1, 80 parts by weight of the same hard-burnt quick lime as in Example 1, and 4 parts by weight of calcium borate, said particles having a volume of 3 $cm^3$ and a bulk density of 2.7, after which water was poured into the holes. The sandstone piece was allowed to stand at an ambient temperature of 20° C. to observe the state. As a result, it was confirmed that the sandstone was completely demolished into 5 smaller pieces in about 30 minutes without being accompanied by gun-phenomenon, and the demolition working was finished with safe and good workability.

COMPARATIVE EXAMPLE 6

The holes in the same test specimen as in Example 6 were filled with a slurry prepared by mixing a commercially available demolition agent for spring and autumn (CaO, $3CaO.SiO_2$ and $CaSO_4$ were the main components) with water (water/solids weight ratio=0.3). Observing the state of the test specimen, it was confirmed that a period of about 22 hours was required to demolish the test specimen.

EXAMPLE 7

One hole having a diameter of 50 mm and a length of 1,000 mm was drilled in a 1-$m^3$ piece of plain concrete, and filled with a mixture of (1) column-shaped particles of a static expansive demolition agent having a volume of 5.0 $cm^3$ and a bulk density of 2.4 prepared by compression-molding a powdery composition consisting of 30 parts by weight of the same aluminous cement as in Example 1, 70 parts by weight of the same hard-burnt quick lime as in Example 1, and 1.5 parts by weight of potassium borate, and (2) particles having a size of 10 to 2 mm prepared by cracking the column-shaped particles and screening them in a weight ratio of (1)/(2) of 6:4. Thereafter, water was poured into the hole and the concrete piece was allowed to stand at an ambient temperature of 25° C. to observe the state of the concrete. As a result, it was confirmed that the concrete was completely demolished in about 50 minutes without being accompanied by gun-phenomenon.

EXAMPLE 8

A hole having a diameter of 65 mm and a length of 800 mm was drilled in a 1-$m^3$ piece of plain concrete, and was filled with almond-shaped particles of a static expansive demolition agent having a volume of 3.0 $cm^3$ and a bulk density of 2.6 prepared by compression-molding a powdery composition consisting of 13.6 parts by weight of the same aluminous cement as in Example 1, 86.4 parts by weight of the same hard-burnt quick lime as in Example 1 and 6.4 parts by weight of small particles of naturally occurring colemanite ($Ca_2B_6O_{11}.5H_2O$ occurring in Turkey) as calcium borate, said particles having an average particle size of about 2 $\mu$m. Thereafter, water was poured into the hole and the concrete was allowed to stand at an ambient temperature of 8° C. As a result, it was confirmed that the concrete was completely demolished in about 20 minutes without being accompanied by gun-phenomenon.

COMPARATIVE EXAMPLE 6

The same procedure as in Example 8 was repeated, except that the static expansive demolition agent was replaced by a commercially available demolition agent for winter (the main components were CaO, $2CaO.Fe_2O_3$ and $CaSO_4$) in the form of a slurry (water/solids weight ratio=0.3). It was observed that a period of about 24 hours was required to demolish the concrete.

The chemical analysis values of the colemanite used above were as follows:

| | Ig. loss | $SiO_2$ | $Fe_2O_3$ | CaO | MgO | $K_2O$ | $Na_2O$ | $B_2O_3$ | Total |
|---|---|---|---|---|---|---|---|---|---|
| Colemanite | 21.8 | 4.3 | 0.5 | 24.4 | 1.4 | 0.4 | 0.1 | 45.7 | 98.6 |

EXAMPLE 9

Two raws of holes having a caliber of 65 mm and a length of 2 m were drilled at a distance of 60 cm in the bench cut of limestone deposit, and the holes were filled with almond-shaped particles of a static expansive demolition agent having a volume of 2.0 $cm^3$ and a bulk density of 2.7 prepared by compression-molding a powdery composition consisting of 20 parts by weight of the same aluminous cement as in Example 1, 80 parts by weight of the same hard-burnt quick lime as in Example 1, and 8 parts by weight of the same colemanite as in Example 8. Thereafter, water was poured into the holes and the limestone deposit was allowed to stand at an ambient temperature of 27° C. to observe the state. As a result, it was confirmed that cracks having a width of 8 mm were formed in about 15 minutes.

COMPARATIVE EXAMPLE 7

The same precedure as in Example 9 was repeated, except that a commercially available demolition agent for summer (CaO, 2CaO. $Fe_2O_3$, and $CaSO_4$ were the main components) was substituted for the almond-shaped particles of a static expansive demolition agent to conduct the bench cut. It was confirmed that a period of about 23 hours was required until the cracks having a width of 8 mm were formed. When a commercially available demolition agent for winter was substituted therefor gun-phenomenon was caused in about 20 minutes and no crack was formed.

What is claimed is:

1. A static expansive demolition agent in the three-dimensional form obtained by compression-molding a powdery composition consisting essentially of calcium oxide as the expansive component, an aluminous cement and an alkali or alkaline earth metal salt of boric acid wherein the calcium oxide content is 40 to 90% by weight based on the total weight of the calcium oxide and the aluminous cement, the aluminous cement content is 10 to 60% by weight based on the total weight of the calcium oxide and aluminous cement, and the content of the alkali or alkaline earth metal salt of boric acid is 1 to 20 parts by weight per 100 parts by weight of the total of the calcium oxide and the aluminous cement.

2. A static expansive demolition agent according to claim 1 which has a volume of 0.05 to 10 $cm^3$ and a bulk density of 2.0 to 3.2.

3. A static expansive demolition agent according to claim 1 or 2, wherein the calcium oxide is hard-burnt quick lime.

4. A static expansive demolition agent according to claim 1 or 2, wherein the alkali or alkaline earth metal salt or boric acid is lithium borate, sodium borate, potassium borate, magnesium borate or calcium borate.

5. A static expansive demolition agent according to claim 1 or 2, which is in the form of a tablet, briquette or pellet.

6. A process for the static demolition of brittle materials, which comprises drilling holes in a brittle material, filling the holes with a static expansive demolition agent in the three-dimensional form obtained by compression-molding a powdery composition consisting essentially of calcium oxide as the expansive component, an aluminous cement and an alkali or alkaline earth metal salt of boric acid, and thereafter pouring water into the holes, wherein the calcium oxide content is 40 to 90% by weight based the total weight of the calcium oxide and the aluminous cement, the aluminous cement content is 10 to 60% by weight based on the total weight of the calcium oxide the aluminous cement, and the content of the alkali or alkaline earth metal salt of boric acid is 1 to 20 parts by weight per 100 parts by weight of the total of the calcium oxide and the aluminous cement.

* * * * *